(12) United States Patent
Kniffen et al.

(10) Patent No.: US 11,039,044 B2
(45) Date of Patent: Jun. 15, 2021

(54) TARGET DETECTION AND MAPPING USING AN IMAGE ACQUSITION DEVICE

(71) Applicant: Innovative Signal Analysis, Inc., Richardson, TX (US)

(72) Inventors: Stacy Kniffen, Richardson, TX (US); Robert Mingee, Allen, TX (US); Blake Levy, Nashville, TN (US); Daniel Gibbs, Richardson, TX (US); Michael Martin, Royce City, TX (US)

(73) Assignee: Innovative Signal Analysis, Inc., Richardson, TX (US)

( * ) Notice: Subject to any disclaimer, the term of this patent is extended or adjusted under 35 U.S.C. 154(b) by 0 days.

(21) Appl. No.: 15/912,916

(22) Filed: Mar. 6, 2018

(65) Prior Publication Data

US 2018/0255211 A1    Sep. 6, 2018

Related U.S. Application Data

(60) Provisional application No. 62/467,457, filed on Mar. 6, 2017.

(51) Int. Cl.
*H04N 5/14* (2006.01)
*G06T 7/246* (2017.01)
(Continued)

(52) U.S. Cl.
CPC ......... *H04N 5/144* (2013.01); *G06K 9/00201* (2013.01); *G06K 9/6273* (2013.01);
(Continued)

(58) Field of Classification Search
None
See application file for complete search history.

(56) References Cited

U.S. PATENT DOCUMENTS 5,646,857 A * 7/1997 McBurney ............... G01C 5/00
   701/469
6,295,367 B1 * 9/2001 Crabtree ............... G01S 3/7865
   382/103
(Continued)

OTHER PUBLICATIONS

International Search Report and Written opinion, Application PCT/US2018/021039, dated Jun. 28, 2018. 14 pages.
(Continued)

*Primary Examiner* — Edemio Navas, Jr.
(74) *Attorney, Agent, or Firm* — Wesley W. Malherek; Kelly, Holt & Christenson, PLLC

(57) ABSTRACT

A system for providing a geographical location for a detected moving object is presented. The system comprises a camera configured to capture a first image of a field of view at a first time, and a second image of a field of view at a second time. The field of view includes a moving object. The system also comprises a processor configured to receive the first and second images of the field of view, index the first and second images based on an associated timestamp, and provide the first and second images to a nonvolatile storage medium. The system also comprises a change detection module configured to compare the first and second images and detect the moving object. The system also comprises a position identification module configured to calculate and provide the geographical location for the detected moving object, based on a known location of the camera, and a calibration of the field of view. The system also comprises a display, configured to receive an updated display feed from the processor. The updated display feed comprises the second image, an indication of the detected moving object, and an indication of a location of the detected moving object.

16 Claims, 17 Drawing Sheets

(51) Int. Cl.
  *G06T 7/70* (2017.01)
  *H04N 5/232* (2006.01)
  *H04N 7/18* (2006.01)
  *G06K 9/00* (2006.01)
  *H04N 17/00* (2006.01)
  *G06T 7/73* (2017.01)
  *G06K 9/62* (2006.01)

(52) U.S. Cl.
  CPC .............. *G06T 7/248* (2017.01); *G06T 7/70* (2017.01); *G06T 7/74* (2017.01); *H04N 5/23218* (2018.08); *H04N 5/23293* (2013.01); *H04N 5/23296* (2013.01); *H04N 7/18* (2013.01); *H04N 17/002* (2013.01); *G06T 2207/10016* (2013.01); *G06T 2207/10024* (2013.01); *G06T 2207/30196* (2013.01); *G06T 2207/30232* (2013.01); *G06T 2207/30241* (2013.01); *H04N 5/23238* (2013.01)

(56) References Cited

U.S. PATENT DOCUMENTS

| | | | | |
|---|---|---|---|---|
| 8,174,568 B2* | 5/2012 | Samarasekera | ...... | G01C 21/005 348/113 |
| 8,249,299 B1* | 8/2012 | Dhawan | ...... | G06T 7/246 348/169 |
| 2002/0180759 A1* | 12/2002 | Park | ...... | G06T 3/0012 345/629 |
| 2003/0053658 A1* | 3/2003 | Pavlidis | ...... | G06K 9/00335 382/103 |
| 2004/0119819 A1 | 6/2004 | Aggerwal et al. | | |
| 2007/0039030 A1 | 2/2007 | Romanowich et al. | | |
| 2007/0070233 A1* | 3/2007 | Patterson | ...... | G09B 29/10 348/333.12 |
| 2008/0074494 A1* | 3/2008 | Nemethy | ...... | G01S 3/7864 348/143 |
| 2008/0167814 A1 | 7/2008 | Samarasekera et al. | | |
| 2008/0304706 A1* | 12/2008 | Akisada | ...... | H04N 7/188 382/103 |
| 2012/0169882 A1 | 7/2012 | Millar et al. | | |
| 2013/0278761 A1* | 10/2013 | Wu | ...... | G06K 9/325 348/143 |
| 2014/0104404 A1* | 4/2014 | Locke | ...... | G08B 21/02 348/77 |

OTHER PUBLICATIONS

International Preliminary Report on Patentability, Application PCT/US2018/021039 dated Sep. 10, 2019, 10 pages.
Australian Application No. 2018230677 First Examination Report dated Mar. 25, 2020 3 pages.
Canadian Patent Application No. 3,055,316 Office Action dated Oct. 28, 2020, 4 pages.
Extended Search Report for EP Patent No. 18764832.4 dated July 9. 2020, 10 pages.

* cited by examiner

TARGET DETECTION AND MAPPING USING AN IMAGE ACQUSITION DEVICE

CROSS-REFERENCE TO RELATED APPLICATIONS

The present application is based on and claims the benefit of U.S. Provisional Patent Application Ser. No. 62/467,457 filed Mar. 6, 2017, the content of which application is hereby incorporated by reference in its entirety.

BACKGROUND

In many surveillance operations, a moving object is detected and a search patrol is dispatched to investigate. For example, an oil installation may use radar to detect that an object is moving. In another example, border patrol agents may detect movement along an international border and wish to send a patrol to intercept a potential smuggler. Current radar-camera systems, however, require confirmation of a potential moving, object prior to dispatching a team, as radar alone can give false positives.

SUMMARY

A system for providing a geographical location for a detected moving object is presented. The system comprises a camera configured to capture a first image of a field of view at a first time, and a second image of a field of view at a second time. The field of view includes a moving object. The system also comprises a processor configured to receive the first and second images of the field of view, index the first and second images based on an associated timestamp, and provide the first and second images to a nonvolatile storage medium. The system also comprises a change detection module configured to compare the first and second images and detect the moving object. The system also comprises a position identification module configured to calculate and provide the geographical location for the detected moving object, based on a known location of the camera, and a calibration of the field of view. The system also comprises a display, configured to receive an updated display feed from the processor. The updated display feed comprises the second image, an indication of the detected moving object, and an indication of a location of the detected moving object.

DETAILED DESCRIPTION OF ILLUSTRATIVE EMBODIMENTS

One issue with sending a remotely located patrol unit to investigate a detected moving object is determining where, geographically, to send the patrol unit. For camera-radar systems, the radar unit can provide an indication of where to go. However, a system is desired that can detect a moving object and provide an indication of the detected object on a map that can be used by a patrol. At least some embodiments described herein provide a system for detecting a moving object. Additionally, at least some embodiments described herein provide a system for directing a patrol to a detected moving object.

At least some embodiments described herein consist of one or more wide area video (WAV) cameras and associated electronics configured to detect motion within a wide field of view, map the detected motion to a latitude and longitude (or other desired mapping configuration) and provide an indication of the detected location to a user. However, while several embodiments are described with respect to WAV cameras, it is expressly contemplated that at least some embodiments and systems described herein can be utilized with other camera types.

WAV cameras are known to provide 2D information within a camera image about items of interest. It is desired to translate the detected 2D information into a real world location of an item of interest. Positional information can then be provided, for example, in a map-based view, to an interested individual.

WAV cameras prevent several benefits over other camera systems, such as pan/tilt systems, for example, when used in a wide area surveillance operation. In one embodiment, WAV cameras, because of their wide field of view (for example, up to 90°, up to 180°, or even up to 360°), do not need to pan in order to survey a scene and update an image feed. Once calibrated, a WAV camera system can provide a geographical output for a directed moving object within a field of view.

Figure 1:
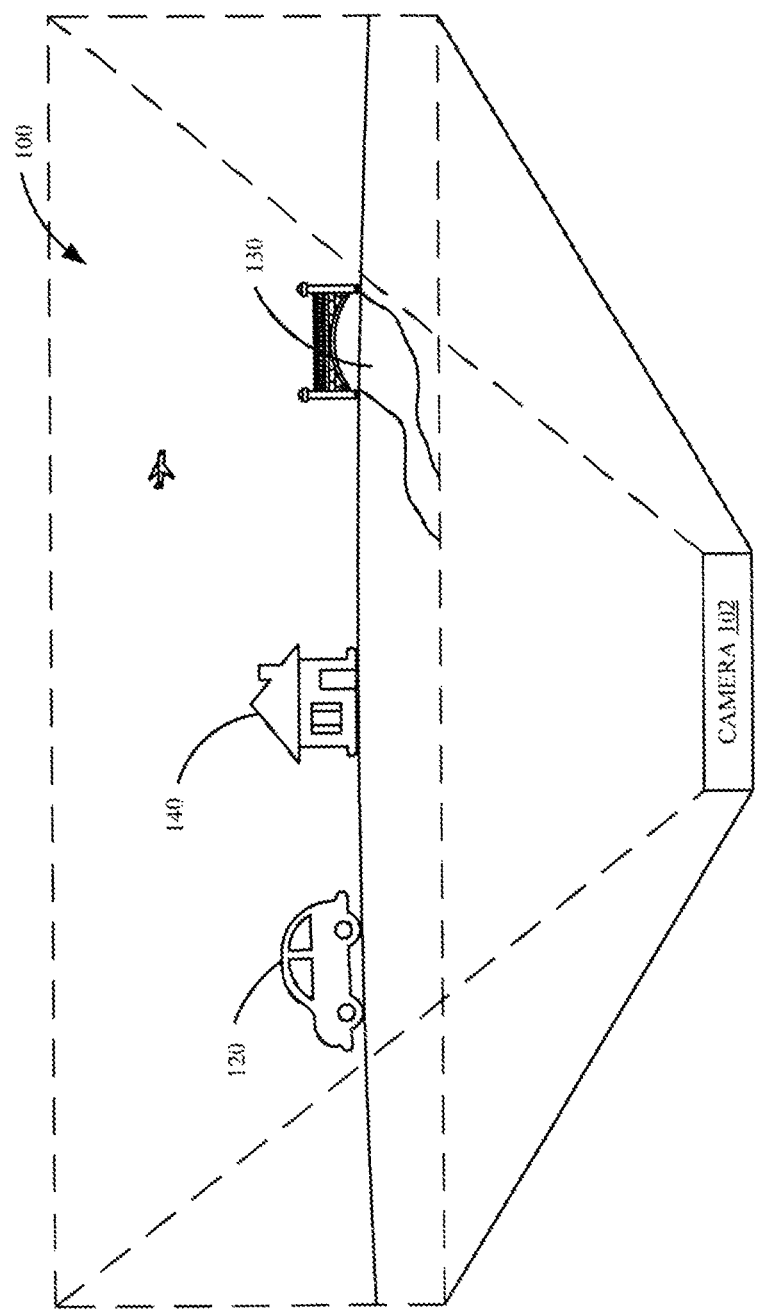
FIG. 1 illustrates an environment, in which embodiments of the present invention may be particularly useful.

FIG. 1 illustrates an environment in which embodiments of the present invention may be particularly useful. As illustrated in FIG. 1, a camera 102 has a field of view 100. For example, in one embodiment, a WAV camera 102 has a wide area field of view 100, able to see a greater distance across a horizon without panning and tilting. However, in another embodiment, camera 102 is a pan/tilt camera, or other suitable camera arrangement capable of viewing a scene.

Camera 102 is, for example able to view a scene 100, which may comprise a plurality of landmarks 130, 140 as well as moving objects 110, 120. For example, a vehicle 120 is illustrated in FIG. 1. A moving truck 120, is also illustrated moving along the road. Physical landmarks, such as river 130, as well as manmade landmarks, such as structure 140, may also be visible within field of view 100.

It may be desired to determine a physical location of moving object 120. While camera 102 can see moving object 120, and perhaps provide an indication of direction, it is desired to translate that indication of direction into a latitude and longitude, for example, that a patrol can go to. Directions can comprise, for example, direction from a currently known patrol location, or, alternatively, from a known location of camera 102, or from another location entirely. For example, in one embodiment, camera 102 is located along an international border, where border patrol agents may be located remotely, such that they can view a plurality of cameras 102, and respond to moving objects detected by any of a plurality of cameras 102.

In one embodiment, a map is obtained. In one embodiment, a map image is obtained, for example from a map repository or a map generation unit such as the Google Maps service (available from Google LLC, with headquarters in Mountain View, Calif. 94043), or another suitable mapping service. The retrieval of a map can be accomplished automatically using a map retrieval algorithm, for example, based on a known location of a camera, and based on an indication that a moving object has been detected within a field of view. The retrieved map can be any suitable, depending on the area of interest. In one embodiment, a mapped image centered on a camera installation is retrieved, extending at least five miles in all directions. However, other sizes of maps may also be suitable, in one embodiment a one-mile radius map is retrieved. In another embodiment, a ten like radius map is retrieved.

In one embodiment, positional information is retrieved for a landmark identifiable in the map image. A landmark can comprise, for example, a building or water tower, or a physical landmark such as a lake or river.

In one embodiment, positional information is obtained for a plurality of landmarks in the map image. In one embodiment, positional information in the field of view can be obtained by a person standing in the field of view with a handheld global positioning service (GPS) unit. The latitude and longitude can be reported by the GPS unit, and the X-Y position of the individual can be recorded using the WAV.

In one embodiment, positional information for a minimum of four landmarks is retrieved. However, in some embodiments, more or fewer landmarks may be necessary in order to calibrate a WAV image such that the physical location of detected objects can be provided. For example, in one embodiment only two landmarks are required, or only three. In other embodiments, five or more landmarks must be retrieved. In one embodiment, all identifiable landmarks in a map image are retrieved. The positional information can be retrieved from a map repository, for example along with the map image, in one embodiment.

Positional information, in one embodiment, comprises a latitude, a longitude and elevation for each landmark. For each landmark, the WAV image has a corresponding x-y coordinate identified by one or more pixels where the landmark intersects with the ground. Using a set of landmarks, a WAV image can be calibrated to output a physical location for a detected moving object. For example, in one embodiment, each pixel of the WAV image is mapped to a physical latitude and longitude location.

Figure 2A:
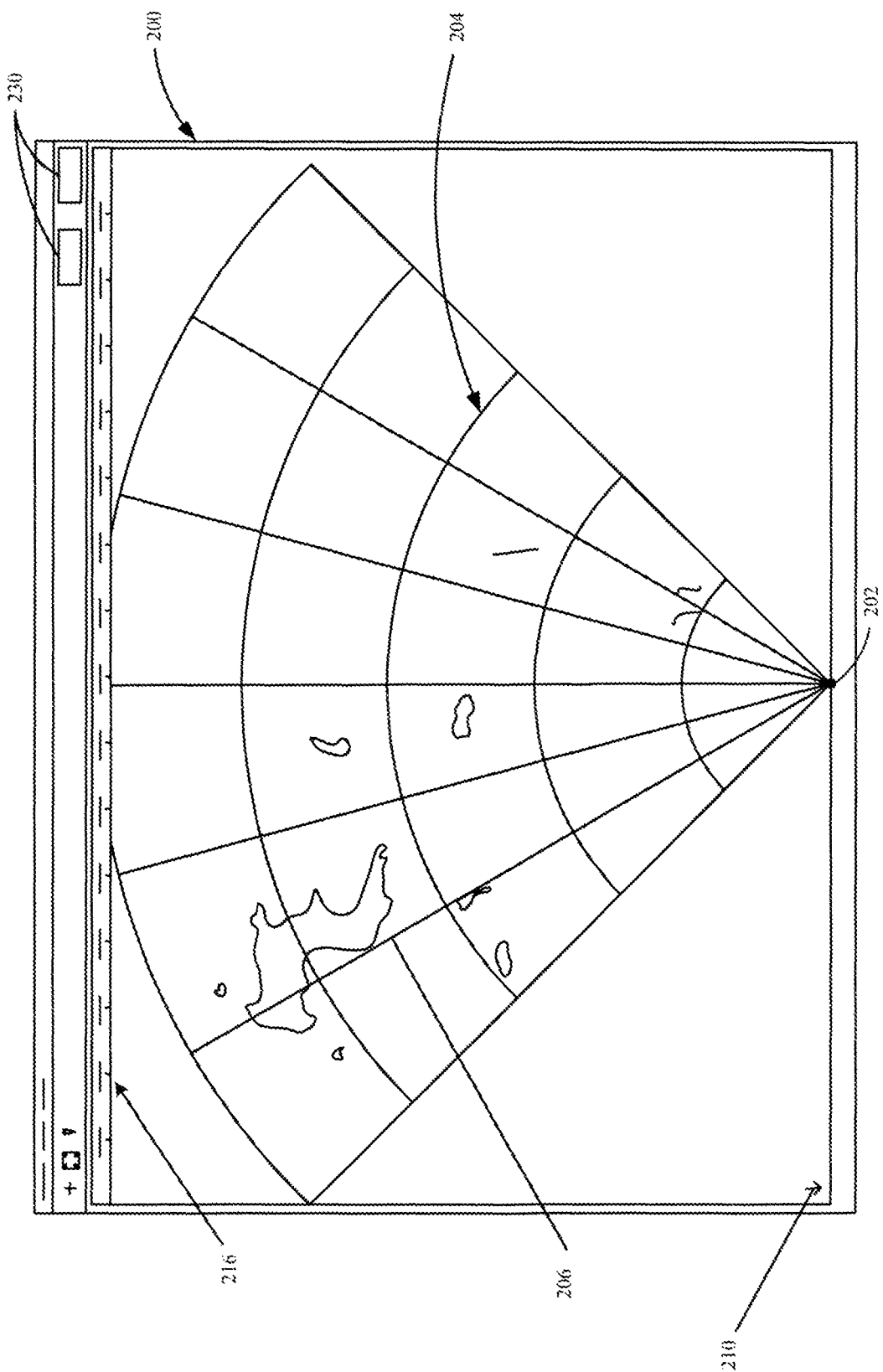
FIGS. 2A and 2B illustrate an example field of view calibration for a camera in accordance with one embodiment of the present invention.
Figure 2B:
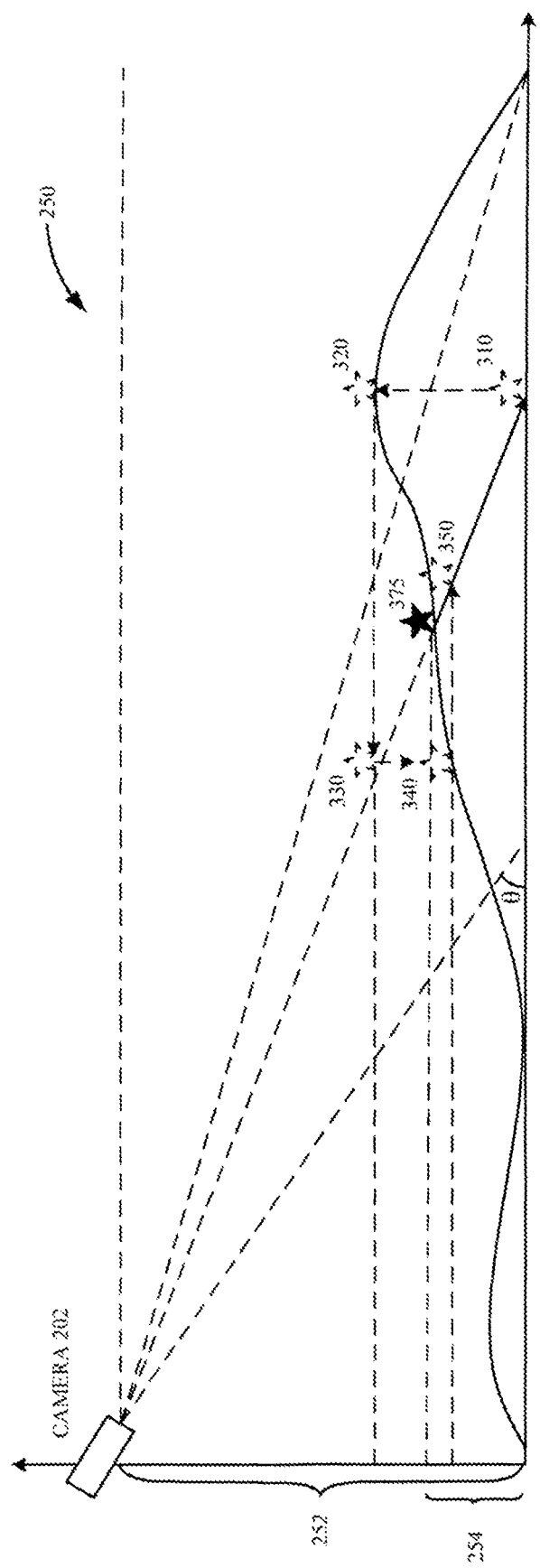

FIGS. 2A and 2B illustrate an example field of view calibration for a camera in accordance with one embodiment of the present invention. A view similar to that illustrated in FIG. 2A, display can also serve as a Common Operating Picture (COP) and ingest other sensor data, especially data that are geolocated and can be placed on the map. In some embodiments, a COP can be used to view data from video cameras, radar, AIS, weather, etc., for example by actuating an icon such as icon 230. FIG. 2A illustrates an example field of view 200 visible by a WAV camera 202 in one embodiment of the present invention.

As illustrated in view 200, a camera is located at a position 202. Image 200 may be output, for example, on a display visible to border patrol agents. View 200 may be generated by a processor (not shown) based on an image feed received from camera at location 202, in accordance with one embodiment of the present invention. Image 200 may comprise an indication of North 210 to orient a viewer to the field of view presented by camera at location 202.

Image 200 may include a plurality of range gridlines 204 indicating a range curve with respect to a camera location 202. Additionally, azimuth gridlines 206 may also be provided along with an azimuth scale 216, indicating directionality from camera location 202.

WAV cameras can be configured to monitor a field of view for movement of important targets, in one embodiment, by acquiring images of field of view 200 in sequence, such that pixel changes between sequentially captured images can be detected. In one embodiment, new images are captured at a regular rate by a WAV camera and analyzed for changes. In one embodiment, images are taken at a rate of roughly once per second. However, other rates are also envisioned as appropriate for other surveillance scenarios, for example multiple times per second, or only a few times per minute, in the case of slowly moving objects. Each image can be compared to the previously taken image, and changes in pixels can indicate a moving object. In one embodiment, the sequential images are substantially spatially registered over time.

FIG. 2B illustrates an iterative approach to determining a marker range on an image feed from a camera. FIG. 2B illustrates on example iterative calculation of determining range and altitude of a detected image based on the image feed from a WAV camera 202. Because WAV cameras can perceive images at a significant range, it is necessary to account fear the fact that the Earth has curvature, as well as a non-uniform surface. An iterative approach, such as that illustrated in FIG. 2B can be used to determine the range of a marker identified on an image feed 200. For example, a marker may indicate a location of a detected moving object, such as truck 120, or an indication of a physical location, such as structure 140.

In order to iteratively determine a range in altitude for detected moving object 375, a flat Earth model for as first range approximation can be used, in accordance with Equation 1 below.

$$\text{Range} = \frac{Alt_{Cam}}{\tan(|\theta_p|)} \quad \text{Equation 1}$$

Using a known altitude 252 of camera 202, a first range approximation 310 can be obtained, as illustrated in Equation 1 above.

Knowing the altitude at a given approximate range, based on a retrieved map image of the area, an approximate range can be detected, as indicated at reference numeral 320. In one embodiment, an elevation lookup table is used. However, other suitable methods for determining elevation at a location are also envisioned herein.

A second range approximation is determined, using Equation 2 below, based on the known altitude of the camera and an approximated altitude of the marker, taking into account the angle of elevation, $\theta_p$, as illustrated by reference numeral 330.

$$\text{Range} = \frac{(Alt_{Cam} - Alt_{marker})}{\tan(|\theta_p|)} \qquad \text{EQUATION 2}$$

As illustrated by reference numeral 340, based on the new approximated range 330, a new altitude is determined, for example, by using the same elevation lookup table used previously. The second altitude determined is indicated by reference numeral 340.

As indicated by reference numeral 350, new range and altitude estimates are iteratively determined, based on a preset tolerance, until the range in altitude do not change more than by the given tolerance. This can allow for a significantly close approximation 350 of marker 375. Which has a set range, an altitude 254.

Figure 3:
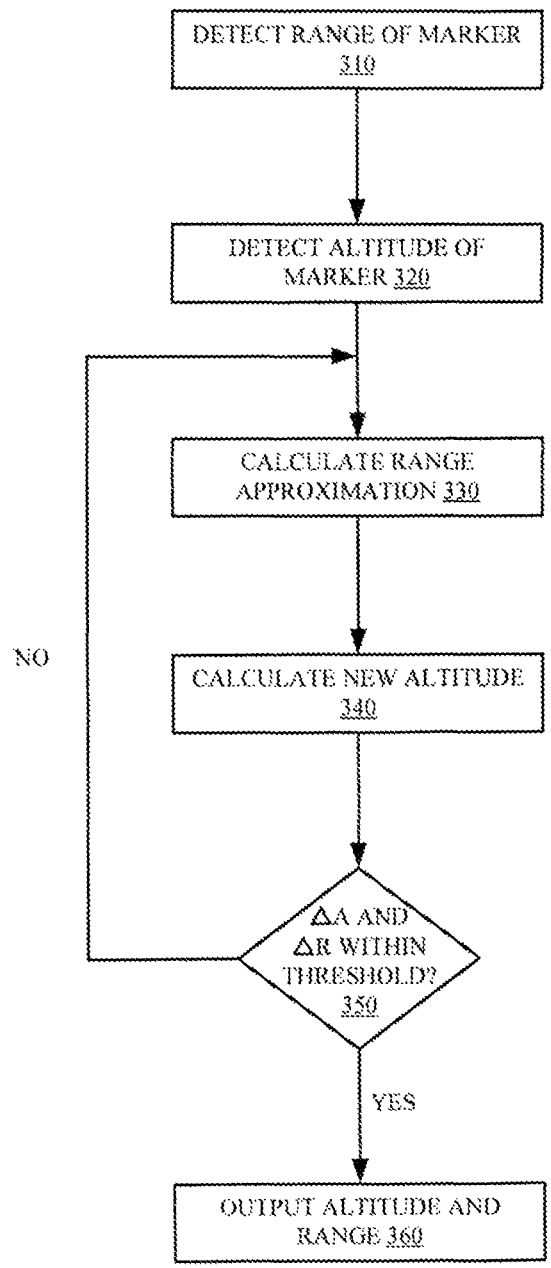
FIG. 3 is a flow diagram of an example method of determining range in altitude of a marker viewed on a camera in accordance with an embodiment of the present invention.

FIG. 3 is a flow diagram of an example method of determining range in altitude of a marker viewed on a camera in accordance with an embodiment of the present invention. Method 300 may be used, for example in conjunction with the calculation illustrated in FIG. 2B. However, method 300 may also be used in accordance with other suitable methods and systems.

In block 310, a marker is detected, with initial approximated range, assuming an altitude of 0. For example, a marker can be identified as a detected moving object within a calibrated field of view of a camera.

In block 320, an altitude of the first marker is calculated, based on the initially approximated range. For example, an altitude can be determined using a lookup table, or other suitable source of information about elevation at a known or estimated location.

As illustrated in blocks 330 and 340, an iterative calculation is conducted until a change in altitude and change of range between subsequent iterations are within a given threshold, as indicated in block 350. Iteratively, a new range is approximated, as indicated in block 330, and a new altitude is obtained, based on the newly approximated range, as indicated in block 340. If the change in altitude and the change in range from an N−1 approximation to an N approximation are within a given threshold, the altitude and range are output, for example as a pop-up window on a display 200, other suitable outputs are envisioned herein. However, if the change in altitude and the change of range are not within the threshold, the steps of blocks 330 and 340 are iterated. This process repeats until a suitable approximation is obtained for the marker identified on a WAV image.

At block 360, an altitude and range is output. The altitude and range may be output, for example, on a display including the WAV camera image. Alternatively, the altitude and range may be output on a separate display, for example either of a local display, or a remote display associated with a patrol responding to the detected marker. The output can comprise, for example, a bearing, range and altitude, in one embodiment. In another embodiment, a latitude, longitude and altitude are output.

Figure 4A:
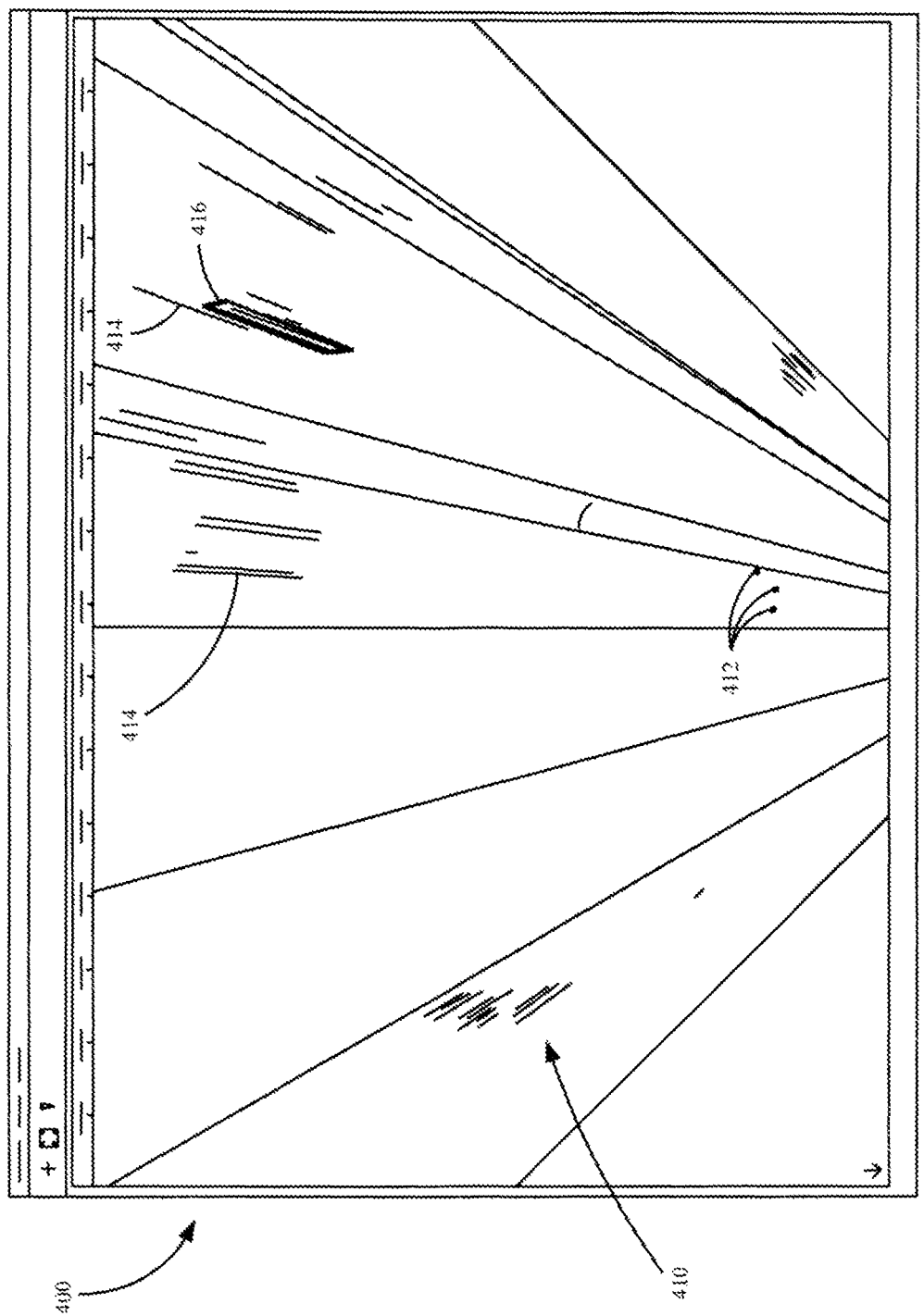
FIGS. 4A-4C illustrate a plurality of images of detected objects accordance with an embodiment of the present invention.
Figure 4B:
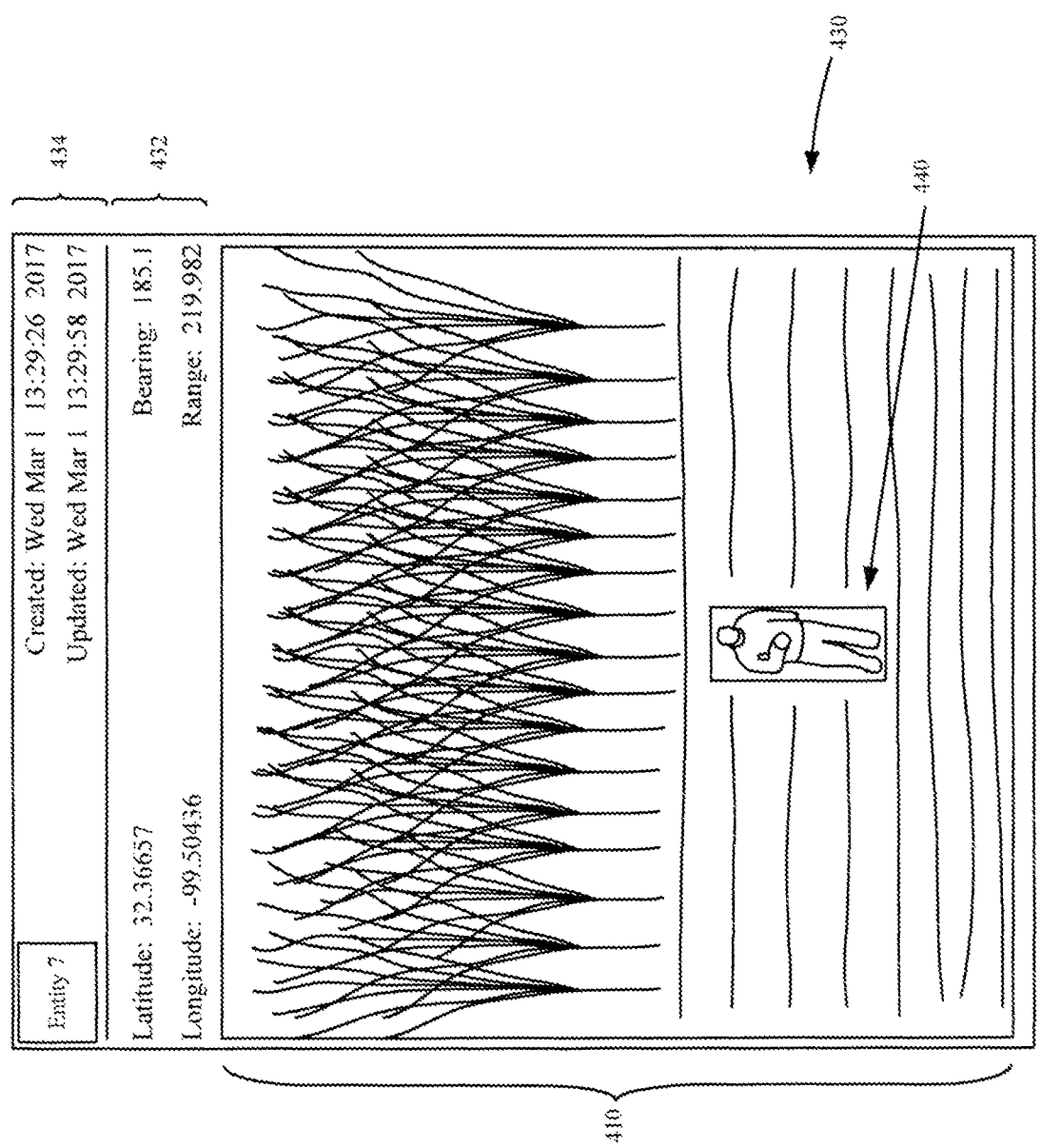
Figure 4C:
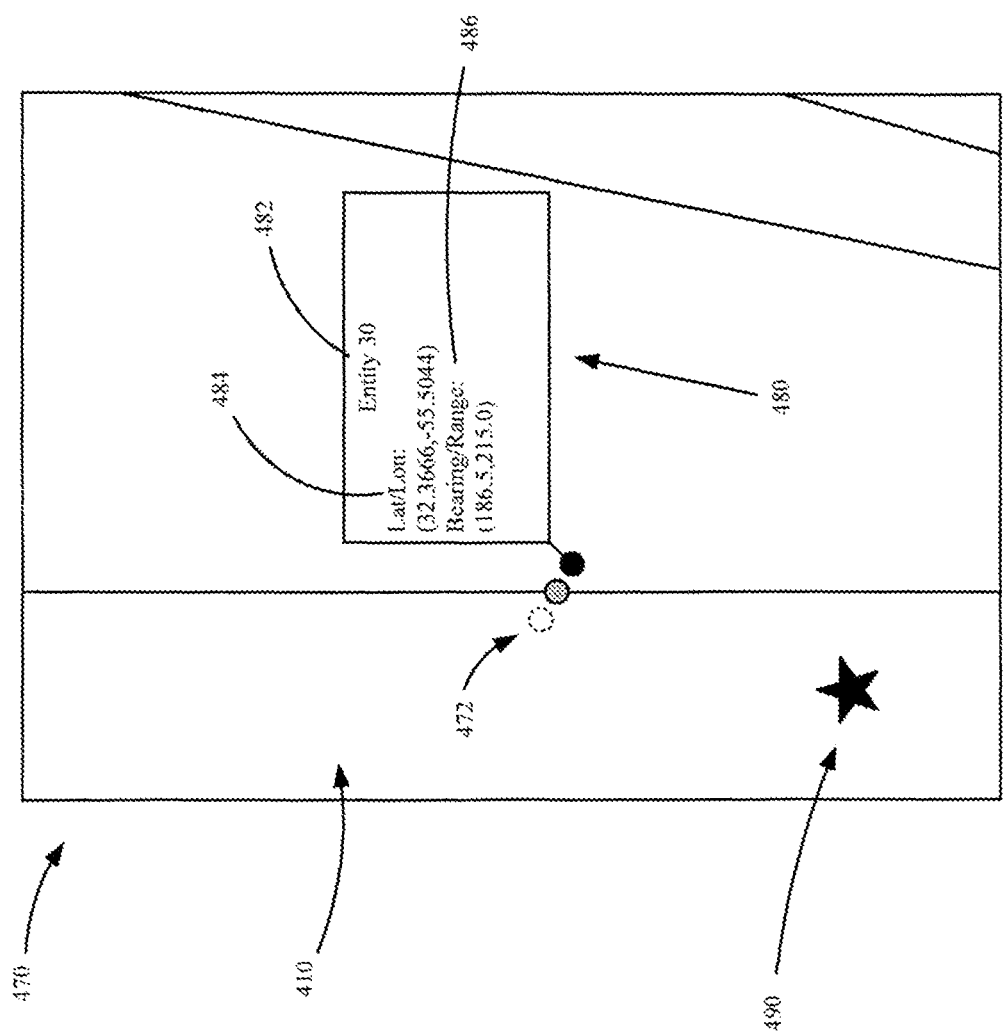

FIGS. 4A-4C illustrate a plurality of images of detected objects in accordance with an embodiment of the present invention. As illustrated in FIG. 4A, a change detection system can, by analyzing subsequent images, identify and indicate moving objects by detecting, and highlighting, changes in pixels. In one embodiment, detected changes in pixels are identified using a first color, while the background image is identified with a second color.

As illustrated in FIG. 4A, a camera image 400 may comprise a field of view 410, within which a plurality of tracks 412, and detected changes 414 are highlighted. Often, a single moving object will result in several detected changes 414. For example, a walking person may result in a plurality of detects for example where each of a head, hands, and feet move.

As noted in FIG. 4A, a plurality of detected changing objects can be grouped together and identified as glob 416. Based on an algorithm, a processor of the camera image may identify a plurality of detected changes 414 as a single moving object, and indicate it using glob 416. The size of the glob, coupled with the range estimate, can be used to determine the object's physical, size and classify the moving object as animal, human, or vehicle. Globs 416 may be indicated using a third color. For example, in one embodiment, a background camera image is presented with a gray field of view 410, yellow detected changes 414, and blue globs 416. However, other suitable color and/or texture combinations may also be envisioned. For example, glob 416 could be represented by a shape, such as a polygon, encapsulating associated detected changes suspected to comprise a single moving object (e.g. encapsulating detected changes corresponding, to a head, hands and feet of a moving person).

In one embodiment, it may be easier, to track an identified group of moving objects as a glob 416, and, for example generate a single track 412 associated with glob 416 within a group of detected moving objects. For example, a moving vehicle may generate an area on a display spanning a number of pixels wide and tall. While it is possible to identify and track each changing pixel as a separate moving object, it may be easier for an observer to process the information has a single glob representing the whole moving vehicle. In one embodiment, tracks are identified using a third indication type (for example the color red), as illustrated in FIG. 4A.

A plurality of analysis and display tools are available once a moving object is detected in one embodiment. For example, as indicated in FIG. 4A, all moving objects can be identified and, additional information provided as an overlay on a map image. Additionally, the map and field of view 410 can be provided on a display to enable zooming and translation of the retrieved image feed, e.g. as illustrated in FIG. 4B. Additionally, the intensity of the underlying map may be adjustable, in one embodiment, to enhance contrast against overlayed indications and data for maps with significant amounts of concentrated information (e.g. a plurality of detected moving objects in close proximity). Additionally, in one embodiment, latitude and longitude information can be retrieved for any point on the map image, and displayed along with an associated object. In one embodiment, bearing and range information can be retrieved for any point on the map. Additionally, a WAV image subset may be available for any point on the WAV field of view.

As illustrated in FIG. 4B, an image subset is available for points on a WAV image field of view 410. As indicated, WAV subset image 430, can be presented along with information about the surrounding field of view 410, along with positional information 432, and lifespan information 434, about detected moving object 440. Detected moving object 440, as indicated in FIG. 4B, may be detected initially as a plurality of different moving objects, and may be assembled into a single glob 416 (illustrated by a rectangle 434), to indicate that the plurality of detected moving objects are actually associated with only a single moving object. Lifespan information 434, in one embodiment, may indicate when the first pixel changes were detected, and when a most recent update had occurred. Positional information may comprise latitude, longitude, bearing, and range with the bearing and range being, respective of the camera taking the field of view image 410.

FIG. 4C illustrates detailed track information view 470 presented on a field of view 410. Detailed information 470 can be available with respect to any detected moving object on a field of view. For example, tracks, detected changes, and globs may all have associated information that can be obtained and viewed by a user of an associated display. Depending on where a camera is capturing image information, multiple moving objects may be detected at a single time, such that providing such information automatically would create a cluttered field of view difficult to interpret by a user. Therefore, in at least one embodiment, information window 480 is only available based on a request from a user, for example by a user clicking on or otherwise actuating an actuatable item on a field of view 410.

Track history 472 can give a visual history of a path of a detected track over a period of time. In one embodiment, the individual tracks fade out over a user configurable span of updates. For example, it may not be necessary to see where a moving object was first detected an hour ago, it may only be helpful to see where the object has been in the most recent five minutes, therefore history beyond five minutes may have faded out and be no longer visible at this time. Information about the tracks may be available in window 480, as illustrated, with positional information 484 and bearing range information 486 presented along with an identification number 482. In one embodiment, identification number 482 is associated with the detected moving object throughout a surveillance operation. For example, a video recording may comprise a series of frames, e.g. Frame 1, Frame 2 . . . Frame N. Identification number 482, then, is associated with the detected moving object throughout the series of Frames 1-N.

Identification numbers 482, in one embodiment, are sequentially assigned as new moving objects are detected, such that positional and range information can be stored for each detected moving object over time. All information may be retrievable, in one embodiment, and stored in a nonvolatile memory, for example a database. The database may be located physically with the camera taking image 410, remotely from the camera taking image 410, for example at a processor showing image 410, or may be stored in a cloud-based data storage.

In one embodiment, a user can also identify an area of interest on the map 490. For example, as indicated in FIG. 4C, marker 490 is placed by user on a portion of the map image of interest.

A user may be able to bring up the marked area 490 in a separate window, in one embodiment. The separate window may update at the same time, or a different rate as that of the main map image 410, in one embodiment. The location of the sub-image within the full WAV image may be indicated, in one embodiment. Additionally, an azimuth angle may also be indicated provided a bearing at the center of the sub-image, in one embodiment.

As illustrated in FIGS. 4A-4C, a WAV image can include a number of markers identifying different user selected, and detected, moving objects within an image. For example, lines of constant bearing and constant range can be overlayed on a map image, in one embodiment. This may be a selectable overlay, for example on a toolbar available within a user interface on a display. A position on the map, for example marker 490, may be selected for example using a user input mechanism such as a mouse or keyboard. Additionally, marker 490 can be deselected, in one embodiment, using the same or different user input mechanism.

In one embodiment, a camera operates as part of a camera algorithm system, for example a WAV camera algorithm system (WAS). A WAS, in one embodiment, is coupled to a data manager which stores detected changes, tracks, and globs over time. A data manager, in one embodiment, may provide indications of located tracks, globs and/or change detects on a viewer for a user. One or more viewers may be coupled to a WAS controller, for example including an operator associated with the WAV camera and remote patrol.

The WAS controller may also be coupled to a WAV camera archive, configured to store previously captured images, detect indications, etc. The WAV camera may, in one embodiment, be part of a WAV camera subsystem, coupled to a processing subsystem. The WAV processing subsystem, in one embodiment, may be coupled to an archive subsystem. A viewer may also be coupled to a WAV archive system, in one embodiment, in order to present the detected change globs and tracks.

The WAV camera algorithm system, in one embodiment, operates according to a given procedure. For example, an image is obtained, and processed, for example against previously captured images, and a change is detected, for example based on a detected change in pixels within an $image_{N-1}$ to an $image_N$. The detected change is processed, for example, along with nearby detected changes, to determine whether a grouping can be made. If a grouping can be made, a glob is generated such that it can be tracked over time. Such a procedure is indicated in FIGS. 5A-5C, discussed below.

Figure 5A:
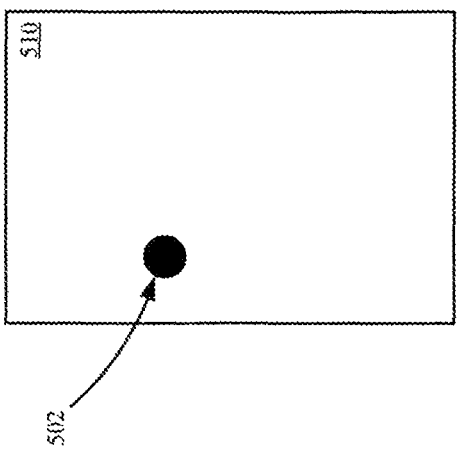
FIGS. 5A-5C illustrate a change detection algorithm view in accordance with one embodiment of the present invention.
Figure 5B:
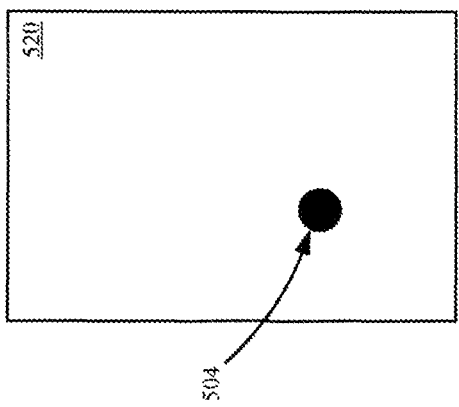
Figure 5C:
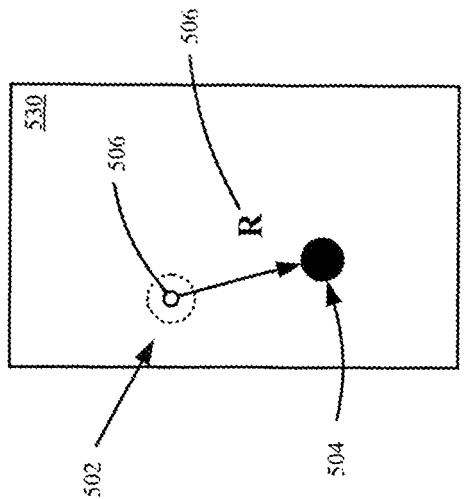

FIGS. 5A-5C illustrate a change detection algorithm view in accordance with one embodiment of the present invention. As illustrated in FIGS. 5A-5C, a track sequence can be generated, in one embodiment, by sequentially plotting detected positions of a moving object over time. Moving object positions may comprise, for example a single moving object, or a glob of detected moving objects. In the embodiment illustrated in FIGS. 5A-5C, positions of a detected moving object (either a single object or a glob) are plotted and updated at two different, sequential times. In some embodiments, a line is drawn between detected positions with each update, as illustrated in FIG. 5C. However, in other embodiments, only the detected object positions are plotted, with no connecting lines drawn.

As illustrated in FIG. 5A, at time 1, an image is captured, as indicated by frame 510. Frame 510 illustrates a detected moving object 502. As illustrated in FIG. 5B, at time 2, in the same frame view, a second image is captured, as indicated by frame 520, which shows a detected moving object 504. Comparing frames 510 and 520 can show that a moving object has moved from location 502 to location 504.

FIG. 5C illustrates an overlay of frame 520 on top of frame 510, presented as frame 530 showing both a first detected object position 502, a second detected object position 504 along with a vector 506 showing a distance and direction of travel in the time between frame 510 and 520. In some embodiments, older tracks 508 may fade out over time, or be indicated such that they are distinguishable from a most recent track. As illustrated, a fade out technique 508 is being used to show that detected object 502 was detected less recently than detected object 504. In one embodiment, a WAS uses an algorithm to sequentially conduct the comparison illustrated in FIGS. 5A-5C as sequential images are received from a single camera. When a change in pixels are detected (e.g. at locations 502 and 504), a potential moving object is flagged. In one embodiment, a filter is applied to ensure that fewer false positives are tracked over time or presented on a display to a user.

Once detected, a track for the detected moving object can be updated using two main criteria. In one embodiment, the two criteria comprise glob proximity, and glob size. In one embodiment, globs within a set radius are associated together. In one embodiment, the radius is set by a manufacturer or programmer of a WAV camera system. In another embodiment, the radius is user-specified based on a particular surveillance exercise. For example, radiuses may be selected based on an anticipated detected moving object, for example a detected moving human would require a smaller radius than a detected moving truck, or a detected moving ship. Glob size, in one embodiment, can change as the moving object moves. For example, glob size may decrease as the target gets further away from the camera.

Figure 6:
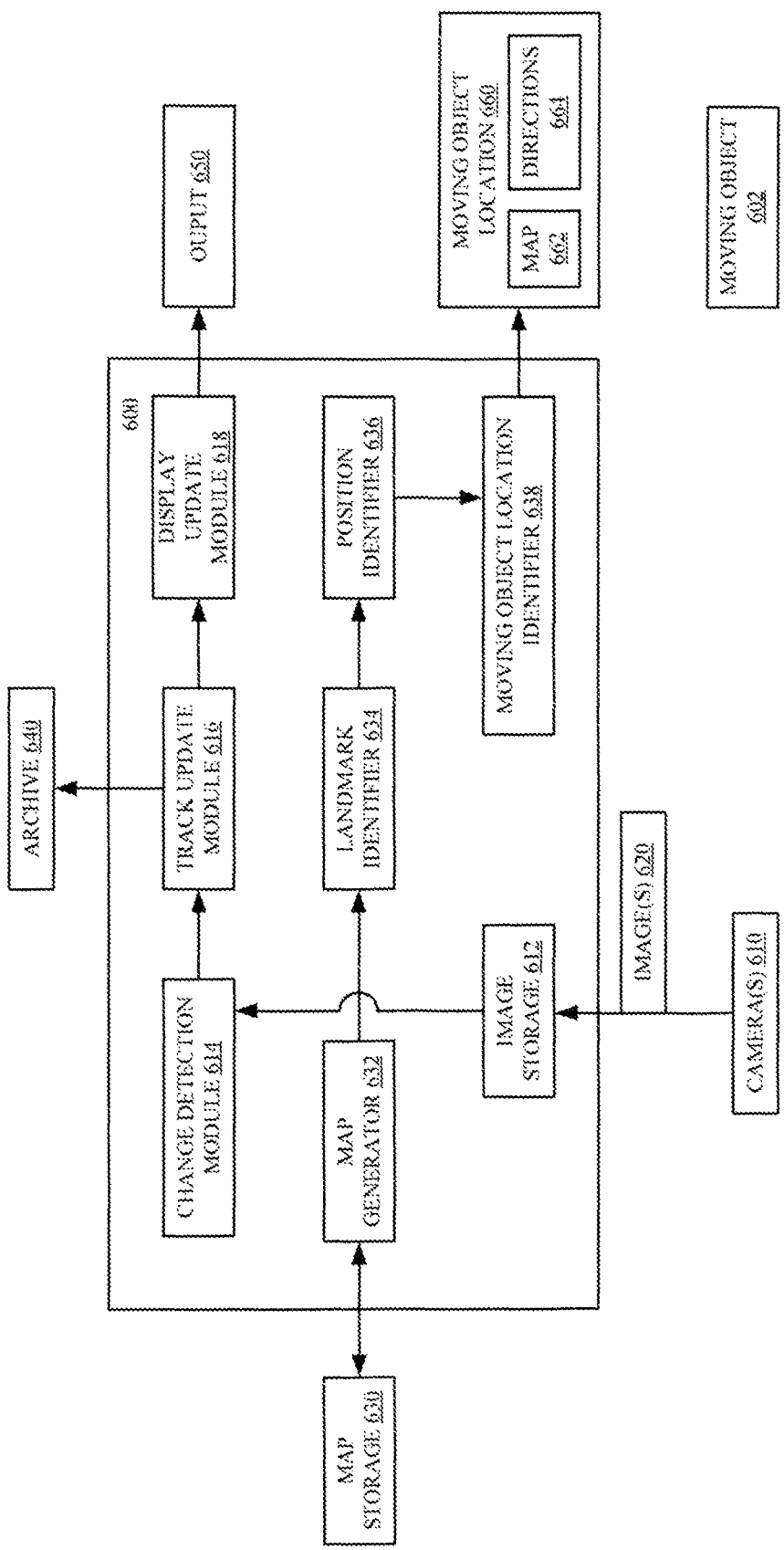
FIG. 6 illustrates a processing system for detecting and tracking moving objects over time, in accordance with one embodiment of the present invention.

FIG. 6 illustrates a processing system for detecting and tracking moving objects over time, in accordance with an embodiment of the present invention. Processing system 600 may be useful in order to process images 620 received from a camera 610 comprising a moving object 602.

Camera 610, in one embodiment, has a moving object 602 within a field of view 604. Camera 610 periodically send images 620 to processing system 600 which, by sequentially comparing images, can identify potential moving object 602.

Processing system 600 may, in one embodiment, be physically located separate from camera 610. In another embodiment, processor 600 is part of an installed camera system 610, such that detection of moving objects occurs locally. For example, a rate of capture of images by camera system 610 may be adjustable based on a detection, or lack thereof, of a moving object within field of view 604. For example, camera 610 may start to capture images more frequently if a potential moving object is detected.

Processing system 600 may receive images, and sequentially number and store them, within image storage 612, in one embodiment. Processing system 600 may, in response to a received image 620, cause a map generator 632 to generate a map of the area enclosed within image 612. The map may be retrieved based on a known location of camera 610, along with an appropriate radius around camera 610. Map generator 320 may, in one embodiment, retrieve a map from a map storage 632, which may comprise a map retrieval service, or a storage of previously used map images. System 600 may automatically retrieve a generated map, in one embodiment, based on an indication of a detected moving object from change detection module 614.

Landmark identifier 634 may, for example based on a map generated by map generator 632, identify a plurality of landmarks within the map image and within field of view 604. In one embodiment, landmark identifier 634 retrieves landmarks from map storage 630. In another embodiment, landmark identifier 634 retrieves landmark information for landmarks known to be within field of view 604. Other suitable landmark identification processes are also envisioned herein.

Position identifier 636 may, in one embodiment, provide positional information for a plurality of landmarks identified within a field of view 604 of camera 610. Position identifier 636 may provide positional information, in one embodiment, based on information stored in map storage 630. For example, position identified may use a map retrieval service, such as Google Maps, to retrieve positional information for identified landmarks.

Moving object location identifier 638, may, based on sequential images from image storage 612, and the known positions of a plurality of landmarks, identify a location of a moving object, and output a moving object location 660. Moving object location 660 may comprise a map 662, or directions 664 to a moving object. Additionally, a moving object location may also comprise a given latitude and longitude location of the object 602, or a bearing range indication for the moving object 668.

In one embodiment, moving object location identifier 638 completes a calibration of camera 610, based on its known location, field of view 604, and the retrieved landmark and landmark position information. In one embodiment, the calibration is completed based on the explanation of FIGS. 2-3 above. However, other calibration techniques may also be possible to correlate an X-Y pixel location with a geographical position (e.g. latitude/longitude or bearing/range).

Processing system 600 may also be configured to identify moving objects, based on sequential images 620 retrieved from camera 610 stored in image storage 612.

A change detection module 614 may compare sequentially taken images, for example comparing $image_N$ to an $image_{N-1}$ to detect whether pixels have changed, in a way that may indicate a moving object. For example, a detected color change in a pixel in two places may indicate that a moving object has moved from a first location to a second location (as described, for example, with respect to FIGS. 5A-5C above). In one embodiment, change detection module 614 is configured to assign an identifier to each detected moving object, such that information about each moving object can be indexed to a specific identifier.

A track update module 616 may engage, in one embodiment, once a change is detected in subsequent images. Track update module 616 may, once a moving object is detected, provide information regularly to archive 640 above a tracked moving object. For example, track update module 616 may associate a detected moving object with an identifier, and provide location information, such as latitude-longitude and/or bearing-range pairs, to archive 640. Track update module 616 may provide such information at the same rate at which images 620 are received from camera 610, in one embodiment, such that each subsequent image has track update information generated by track update module 616 and provided to archive 640. However, in other embodiments, track update module 616 may operate a slower rate than camera 610, such that track updates are only sent, for example every few seconds, every minute, every few minutes, etc. In one embodiment, track update module 616 engages automatically once a moving object is detected and identified. In another embodiment, track update module 616 does not engage until actuated by an operator of system 600.

A display update module 618 is configured to receive information, for example from track update module 616, and provide an output 650. For example, output 650 may comprise a display feed visible to a user, for example a border patrol agent. In another embodiment, providing a display module update using display update module 618 comprises providing an updated location of a track on an existing display, as well as updated positional information for the track, for example as described above with respect to FIGS. 4A-4C.

Figure 7:
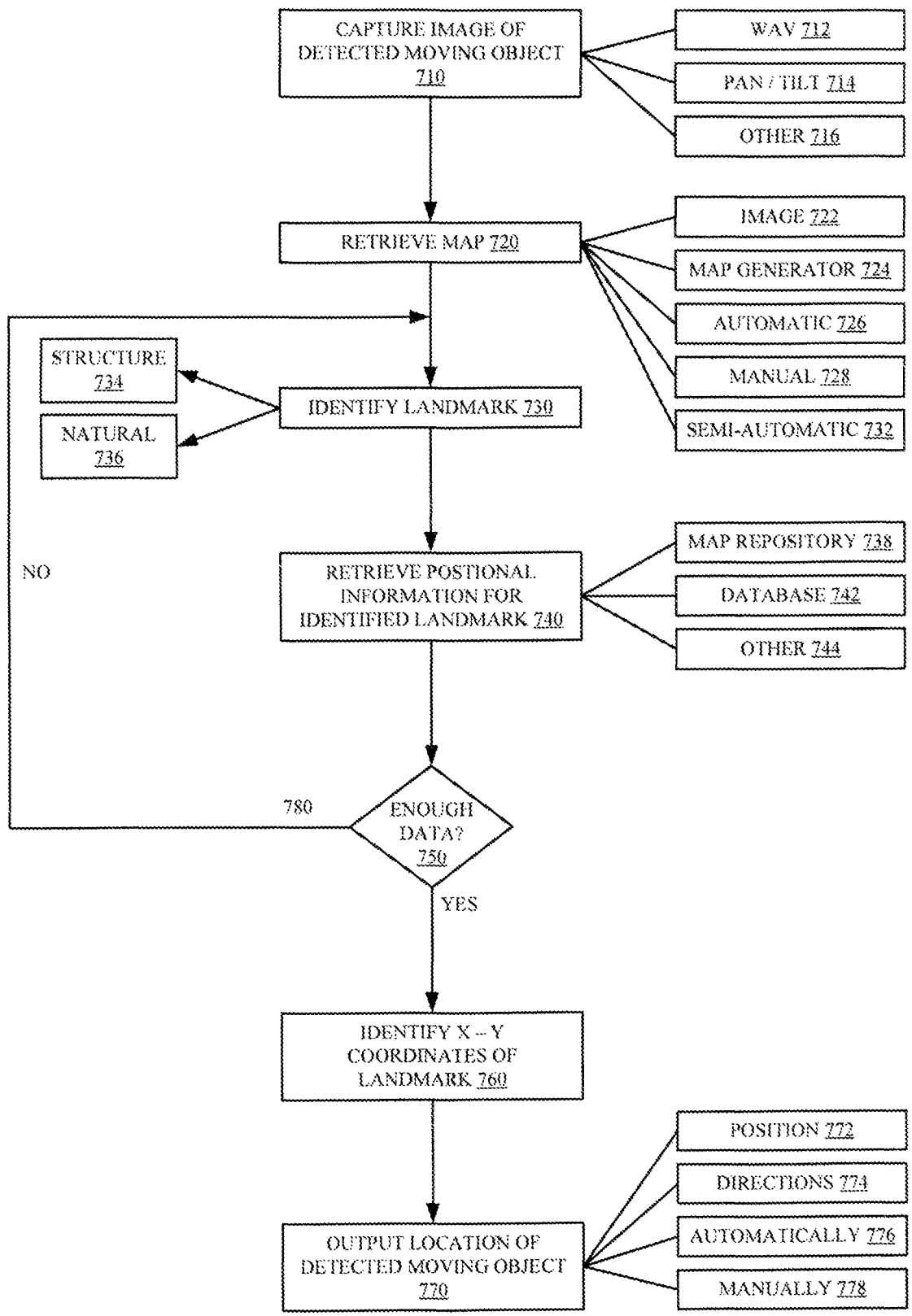
FIG. 7 illustrates a method of detecting and displaying location information for a moving object in accordance with an embodiment of the present invention.

FIG. 7 illustrates a method of detecting and displaying location information for a moving object in accordance with an embodiment of the present invention. Method 700 may be useful by a patrol unit, in order to identify where a moving object is so that the patrol unit can rapidly respond, in one embodiment. In another embodiment, method 700 is useful for an operator to direct a patrol unit to a detected moving object.

In block 710, an image containing a detected moving object is captured. The image may be captured by a WAV camera, as indicated in block 712, a pan/tilt camera as indicated in block 714, or another suitable camera as indicated in block 716. Detecting a moving object within an image may, in one embodiment, comprise a processor identifying, based on analysis of sequential, images, that a moving object is present within a field of view of a camera.

In block 720, a suitable map is retrieved. A map image 722 can be retrieved of the camera and its surrounding landscape. For example, a map image 722 may comprise a satellite image, or other aerial view stored in a database. In another embodiment, retrieving a map can also comprise retrieving a map from a map generator service, as indicated in block 724. In one embodiment, a map is retrieved automatically 726 based on a detected moving object identified within a captured image. However, in another embodiment, a map is not retrieved until a user indicates that location information for a detected moving object is desired, as indicated in block 728. Additionally, retrieving a map can be conducted semi-automatically, as indicated in block 732. For example a map may be retrieved based on a known camera image, but may not be displayed until selected by a user.

In block 730, a landmark is identified within the field of view of a camera. The landmark may be a structural landmark, as indicated in block 734, for example a manmade structure. In another embodiment, the identified landmark can be a natural structure, as indicated in block 736, such as a lake, a river, etc.

In block 740, positional information is retrieved for an identified landmark. Retrieving positional information can comprise consulting a map repository, as indicated in block 738, retrieving information from a database, as indicated in block 742, or using another information source, as indicated in block 744. For example, a map generation service, such as Google Maps, may already have information for identifiable landmarks within the map, such that positional information can be retrieved by requesting it from the map repository directly. In an embodiment where a satellite or other aerial image is retrieved, known landmark information may be stored within a database, for example based on geological surveys, or known locations of landmarks. Additionally, other sources of positional information are also envisioned herein.

As indicated in block 750, if enough data is present to map the pixels of the camera image to a latitude and longitude, the method may proceed to block 760. However, in most embodiments, blocks 730 and 740 will have to be iterated multiple times, as indicated by return arrow 780. In one embodiment, four landmarks must be identified and located, in order for x-y coordinates to be available for each pixel of a camera image. However, in other embodiments, fewer landmarks may be necessary, for example only two or three, or more landmark information may be necessary, for example five or move.

In block 760, x-y coordinates are identified of the landmarks within the WAV image, and, using the x-y coordinates of the landmarks, and the known positional information of the identified landmarks, x-y coordinates of pixels throughout the image can be mapped to positional information, for example latitude and longitude information can be obtained for each pixel within the camera image. In one embodiment, the calibration step of block 760 is conducted when a camera is installed in a location and an initial field of view is identified. In another embodiment, the calibration step only occurs once a moving object is detected.

In block 770, a location of a detected moving object is output, for example to a display, or as another suitable output format. For example, a position of the moving object, as indicated in block 772, can be presented to a user. The position may comprise a latitude-longitude of the identified moving object. Additionally, in one embodiment, directions to the detected moving object are provided, as indicated in block 774. The directions may be provided from the location of the camera, or based on a known location of a patrol unit that will be sent to investigate the moving object.

The output can be made automatically, as indicated in block 776, for example based on initial detection of a moving object, method 700 may automatically engage such that a location is output automatically without any user interaction. However, in other embodiments, the location is output at least semi-manually, as indicated in block 778. For example, method 700 may not engage until a user has actuated an indication of a detected moving object on a user interface, and requested a location. Based on such a user request, method 700 may be engaged, and the location of the detected moving object may be output. In at least some embodiments, for each detected moving object of interest, method 700 is engaged periodically in order to track the movement of the moving object over time.

Figure 8A:
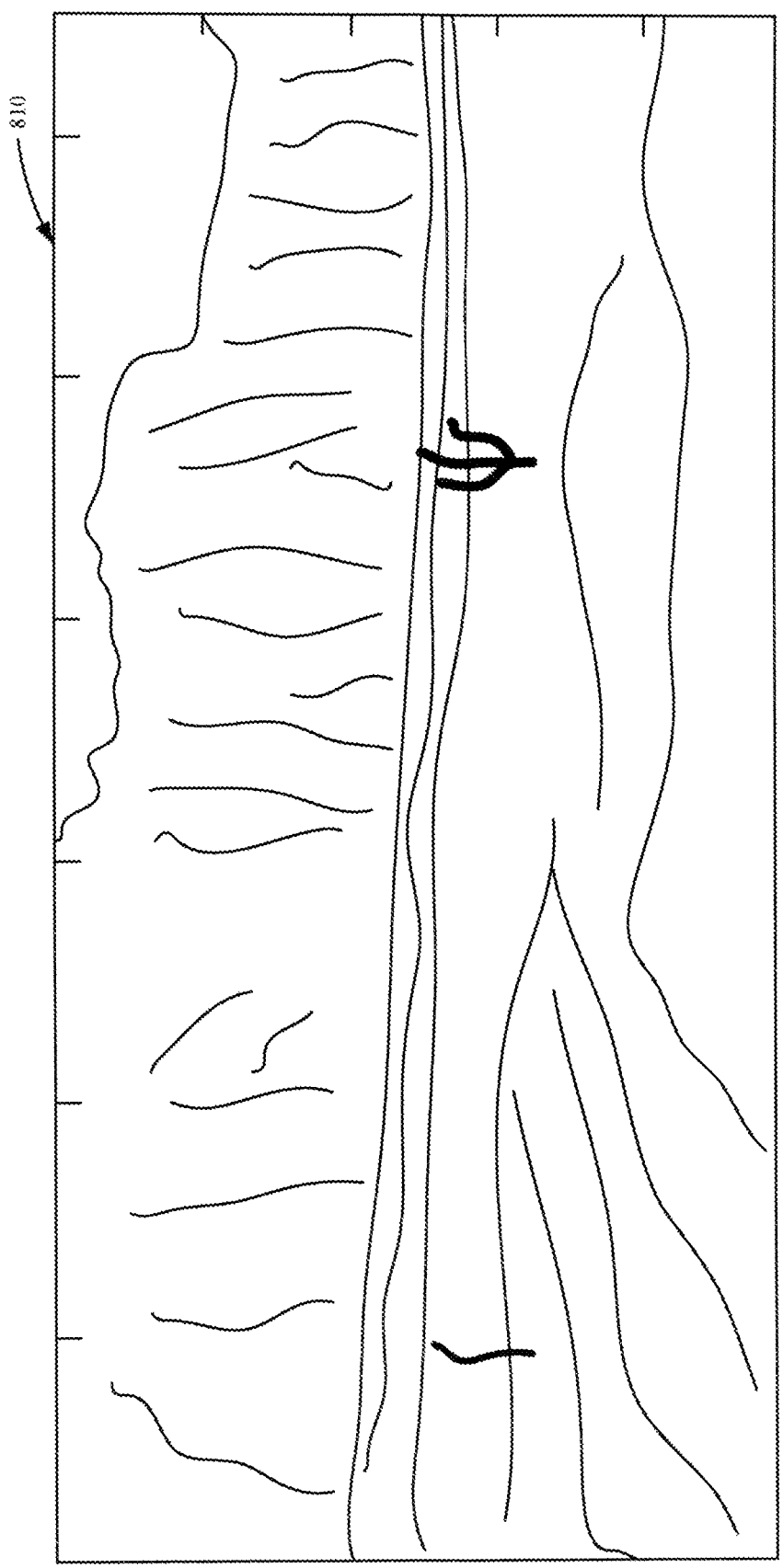
FIGS. 8A-8C illustrate an example geographical calibration of a camera field of view in accordance with one embodiment of the present invention.
Figure 8B:
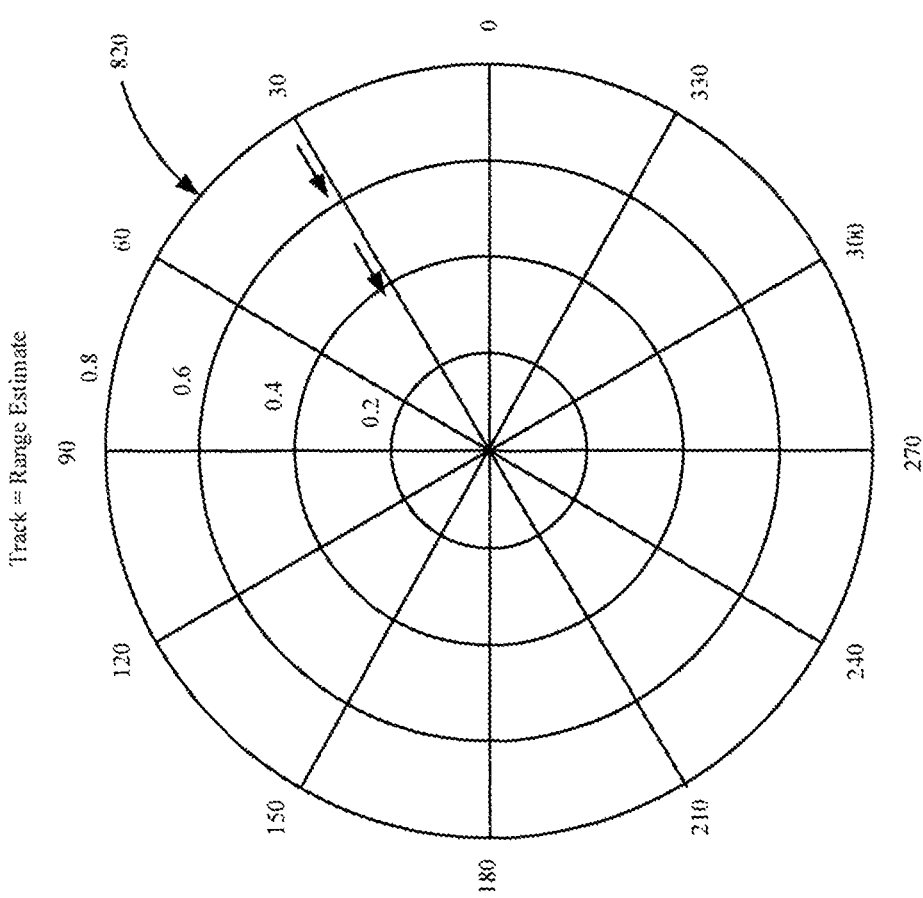
Figure 8C:
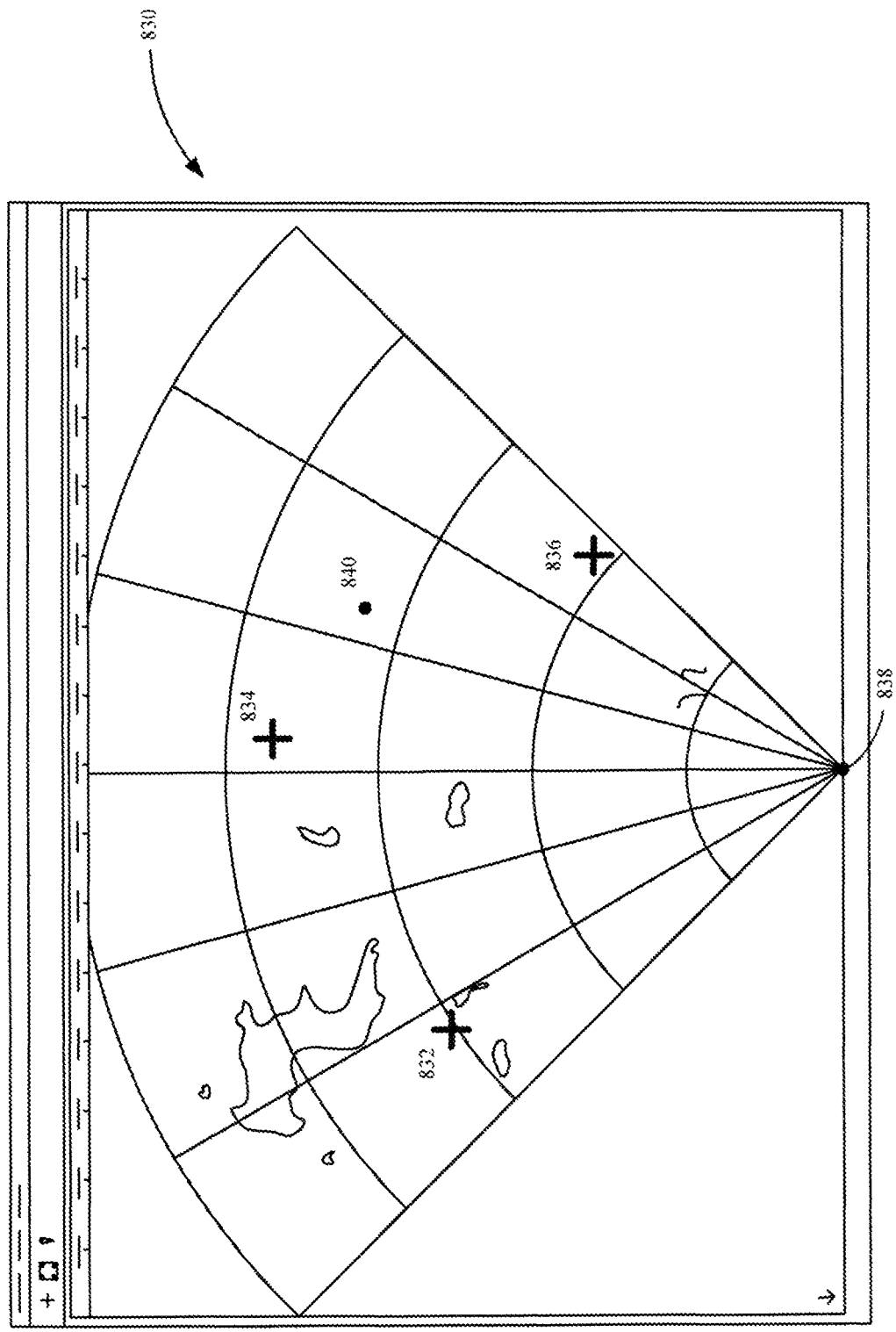

As described above, methods and systems described herein are based on a processor translating an x-y coordinate of a pixel within a camera image into a geographical position such as a latitude-longitude pair or a bearing-range pair. FIGS. 8A-8C illustrate an example method of calculating positional information. For example, an image can be retrieved that corresponds to an image captured by a WAV camera.

FIGS. 8A-8C illustrate an example geographical calibration of a camera field of view in accordance with one embodiment of the present invention. In one embodiment, such a calibration occurs when a camera is first installed in a location. In another embodiment, (or example using a mobile camera, the calibration only occurs when a moving object is detected within an image frame. In one embodiment, the camera calibrated comprises a WAV camera.

As illustrated in FIG. 8A, in one embodiment, a field of view 800 is obtained from a camera. A map image can be retrieved that corresponds to a location of the camera capturing image 810. As illustrated in FIG. 8B, a plurality of detected changes, potentially indicative of moving objects, are indicated on a display view relative to the location of a camera.

As illustrated in FIG. 8C, a series of landmarks 832, 834, and 836 are identified in the map image. The geographic position of the known landmarks can be retrieved, for example from a map repository service, a database, or any other suitable source of location information. The positional information, along with a known position of the camera with respect to the identified landmarks 838 allows for identification of a bearing and range within the image with respect to each of the landmarks. This information allows for the WAS to provide either latitude-longitude or bearing-range identification for any selected pixel on the WAV image, for example pixel 840 which may indicate the location of a moving object.

As illustrated in FIG. 8C, a WAV camera can be calibrated, in one embodiment, with a plurality of in-scene identified landmarks with known latitude and longitude coordinates. As illustrated in FIG. 8C, in one embodiment, only three landmarks are necessary in order to calibrate a WAV camera. However, in other embodiments, more landmarks may be useful in order to ensure accuracy in the calibration, for example four or five, or more.

At least some embodiment presented herein present improvements over previously used methods and systems. For example, some embodiments use passive optics to detect and track targets and provide directions to a target, as opposed to previous methods.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed and presented. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
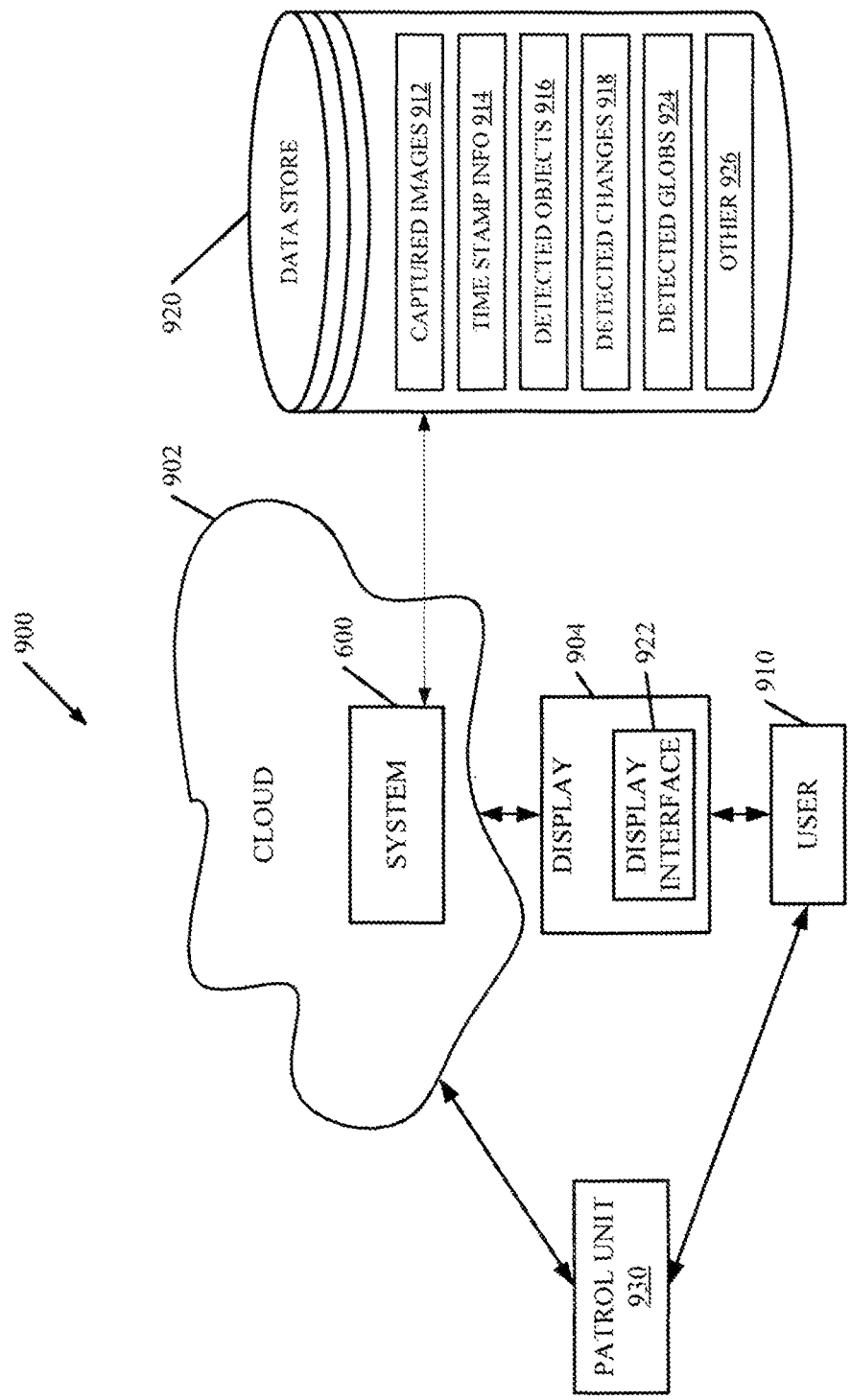
FIGS. 9-11 show examples of mobile devices that can be used in the architectures shown in the previous figures.

FIG. 9 is a block diagram of architecture 600, shown in FIG. 6, except that its elements are disposed in a cloud computing architecture 900. Cloud computing provides computation, software, data access, and storage services that do not require end-user knowledge of the physical location or configuration of the system that delivers the services. In various embodiments, cloud computing delivers the services over a wide area network, such as the internee, using appropriate protocols. For instance, cloud computing providers deliver applications over a wide area network and, they can be accessed through a web browser or any other computing component. Software or components of architecture 600 as well as the corresponding data, can be stored on servers at a remote location. The computing resources in a cloud computing environment can be consolidated at a remote data center location, in one embodiment, or they can be dispersed, in another embodiment. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 6 and they are similarly numbered. FIG. 9 specifically shows that processing system 600 can be located in cloud 902 (which can be public, private, or a combination where portions are public while others are private). Therefore, user 910 uses a user device 904 with a display interface 922 to access those systems through cloud 902. In one embodiment, system 600 is accessible both by an operator 910 in communication with a patrol unit (or multiple patrol units 630), as well as directly accessible by the patrol unit 930.

FIG. 9 shows that it is also contemplated that some elements of computing system 600 can be disposed in cloud 902 while others are not. By way of example, data store 920 can be disposed outside of cloud 902, and accessed through cloud 902, in one embodiment. For example, as described above, a data store may comprise a cache of captured images 912, stored either at a camera location, at a central processing location, or at a remote location separate front system 600. Additionally, data store 920 may comprise stored timestamp information 914, indicative of a time and camera responsible for a received image. Information about detected objects 916 may also be stored in a data store 920. Additionally, information about detected changes 918, and identified globs 924, can also be stored in a single data store 920, or in disparate data stores 920. Other information 926 may also be stored in data store 920.

It will also be noted that architecture 600, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
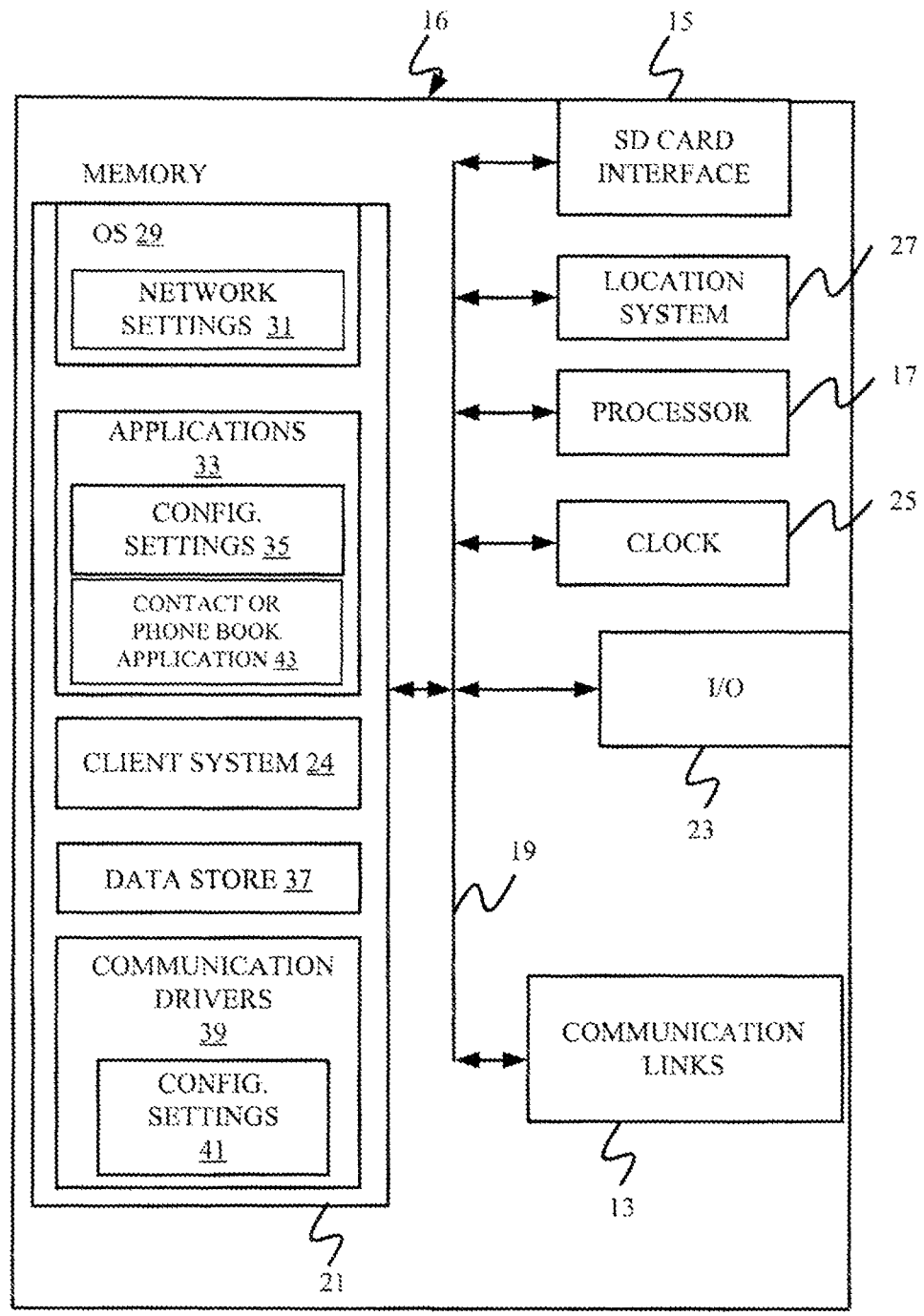
Figure 11:
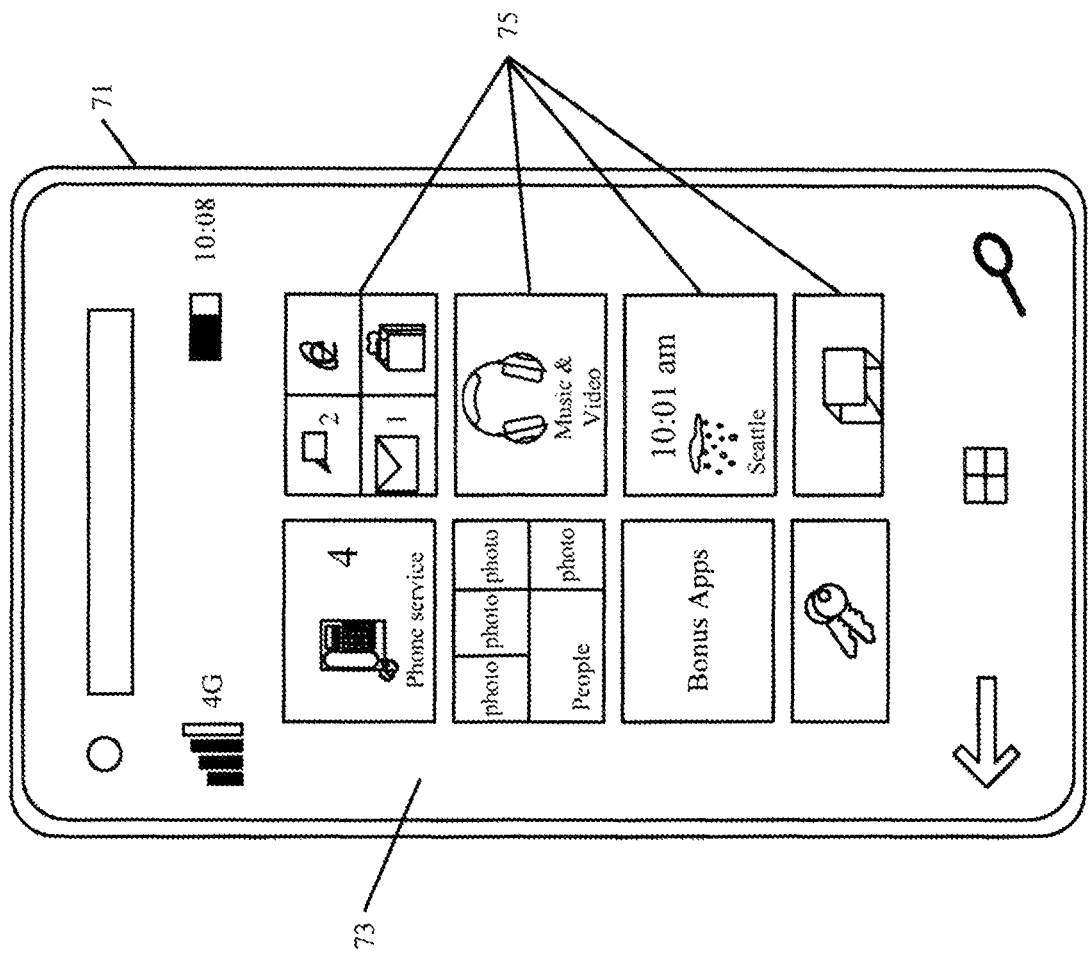
Figure 12:
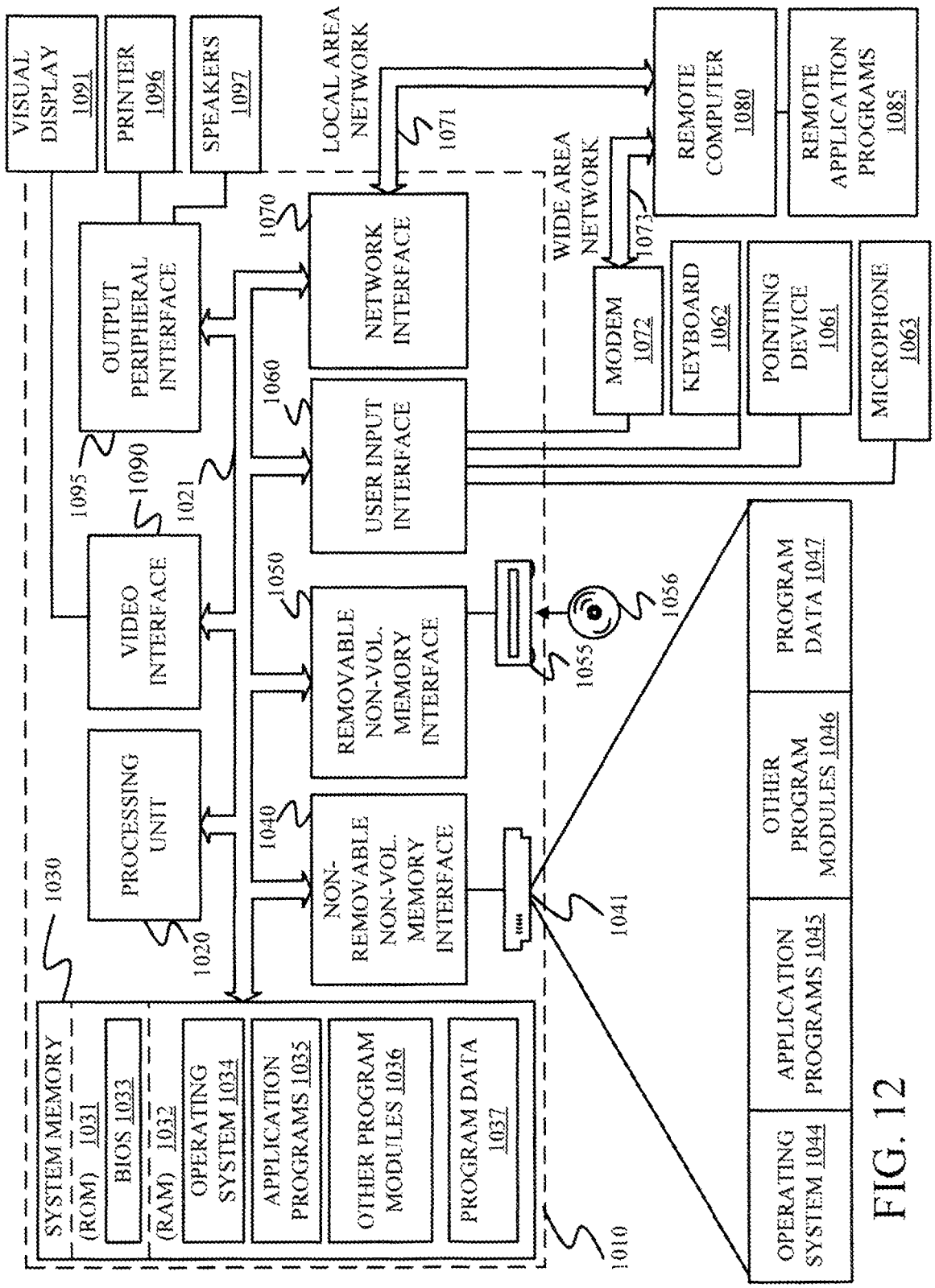
FIG. 12 is a block diagram showing one example of a computing environment that can be used in the architectures shown in the previous figures.

FIG. 10 is a simplified block diagram of one illustrative example of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components computing system 600 or user device 904 that interacts with architecture 600, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. Note that other forms of the devices 16 are possible. For example, device 16 may comprise a desktop computer with a separate display monitor, or a laptop computer, or a tablet, or any other suitable computing device.

FIG. 12 is one example of a computing environment in which architecture 100, or parts of it, (for example) can be deployed. With reference to FIG. 12, an example system for implementing some embodiments includes a general-purpose computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 6 can be deployed in corresponding portions of FIG. 12.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 12 illustrates operating system 1034, application programs 1035, other program modules 1036, and program data 1037.

The computer 1010 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and optical disk drive 1055 are typically connected to the system bus 1021 by a removable memory interface, such as interlace 1050.

Alternatively, or in addition, the functionality described herein can be performed, at least in pan, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 1010. In FIG. 12, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections to one or more remote computers, such as a remote computer 1080. The remote computer 1080 may be a personal computer, a hand-held device, a server, a router, a network PC, a peer device or other common network node, and typically includes many or all of the elements described above relative to the computer 1010. The logical connections depicted in FIG. 12 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 12 illustrates remote application programs 1085 as residing on remote computer 1080. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the present invention has been described with reference to preferred embodiments, workers skilled in the art will recognize that changes may be made in form and detail without departing from the spirit and scope of the invention. For example, while images are discussed frequently herein, it is also expressly contemplated that a camera may record a video, and subsequent images refer to subsequent image frames within a recorded video. Such a video may be streamed such that detection occurs simultaneously, in one embodiment.

What is claimed is:
1. A system for providing a geographical location for a detected moving object, the system comprising:
   a camera configured to capture a first image of a field of view at a first time, and a second image of a field of view at a second time, wherein the field of view includes a plurality of moving objects;

a processor configured to receive the first and second images of the field of view, index the first and second images based on an associated timestamp;

a change detection module configured to compare the first and second images and detect the plurality of moving objects;

a position identification module configured to calculate and provide the geographical location for the plurality of detected moving objects, based on a known location of the camera, and a calibration of the field of view, the geographical location including a longitude and latitude pairing; and a display, configured to receive an updated display feed from the processor, the display comprising:
- a map display element that visually corresponds to a portion of the map,
- at least a portion of the second image,
- a representation of a field of view of the camera,
- a plurality of range indicators on the camera field of view, indicative of distances from the camera,
- a plurality of indications of the plurality of detected moving objects on the representation of the field of view of the camera at positions corresponding to the location of the plurality of detected moving objects,
- a moving object location indication that is overlaid on the map at a moving object position indicative of the geographical location of the plurality of detected moving objects at a position on the map,
- a plurality of bearing indicators on the map indicative of bearings relative to the field of view of the camera,
- a track history indication that is overlaid on the map at a history position indicative of a previous geographical location of the plurality of detected moving objects at a position on the map, the track history indication being configured to automatically fade off of the map over a configurable span of time,
- a glob that encompasses a group of the plurality of indications of the plurality of detected moving objects on the representation of the field of view of the camera, the glob being indicative of the plurality of detected moving objects being part of a larger moving object,
- an information window, actuatable by a user, that is overlaid on the map indicative of detailed information of the plurality of detected moving objects, the detailed information including the geographical location of the plurality of detected moving objects, and
- a plurality of identification number indications indicative of the detection order of the plurality of detected moving objects, the plurality of identification number indications being storable in a database.

2. The system of claim 1, wherein calibration further comprises:
retrieving topographical information about an area surrounding the camera;
identifying a landmark within the area surrounding the camera and retrieving geographical location information for the identified landmark; and
associating a pixel in an X-Y coordinate view of the field of view with a geographical location, based on the retrieved geographical location information for the identified landmark.

3. The system of claim 2, wherein the display comprises:
an indication of the landmark on the representation of the field of view of the camera.

4. The system of claim 1, wherein calibration comprises an iterative calibration.

5. The system of claim 1, wherein the geographical location comprises a bearing and range pairing.

6. The system of claim 1, wherein the geographic location comprises an altitude.

7. The system of claim 1, wherein the camera is a wide area view camera.

8. The system of claim 1, wherein comparing first and second images comprises detecting that a characteristic of a pixel has changed from the first image to the second image.

9. The system of claim 1, wherein comparing first and second images comprises detecting a plurality of pixels have changed, and detecting that the plurality of pixels is indicative of a single moving object.

10. A computing system configured to display a detected moving object, the computing system comprising:
a camera having a field of view, the camera configured to capture a plurality of images;
a source of geographical indicia configured to store indications of the geographical landscape around the camera, including geographical locations of landmarks within the field of view;
a calibration component configured to calibrate the field of view of the camera such that a pixel in one of the plurality of images corresponds to a geographical location, the geographical location including a longitude and latitude pairing, wherein the calibration component generates the correlation based, at least in part, on retrieved geographic locations of landmarks;
a processor configured to compare a first image of the plurality of images to a second image of the plurality of images, detect a change indicative of a moving object and, based on the calibrated field of view, calculate an object geographical location of the moving object, and generate an output indicative of the object geographical location;
a communications component configured to receive the image from the camera, provide the received image to the processor, provide the geographic locations of landmarks to the calibration component, provide the calibrated field of view to the processor, and provide the output from the processor to a display unit; and
wherein the display unit includes:
- a map display element that visually corresponds to a portion of a map;
- a moving object location indication that is overlaid on the map at a moving object position indicative of the geographical location of the moving object at a position on the map,
- an indication of the camera field of view on the map; and
- a plurality of range indicators on the camera field of view, indicative of distances from the camera;
- a plurality of bearing indicators on the map indicative of bearings relative to the field of view of the camera,
- a landmark location indication that is overlaid on the map at a landmark position indicative of one of the geographical locations for one of the landmarks,
- a track history indication that is overlaid on the map at a history position indicative of a previous geographical location of the moving object at a position on the map the track history indication being configured to automatically fade off of the map over a configurable span of time,
- a glob that encompasses a group of the plurality of indications of the plurality of detected moving objects on the representation of the field of view of the camera, the glob being indicative of the plurality of detected moving objects being part of a larger moving object, an information window, actuatable by a user, that is overlaid on the map indicative of detailed information of the plurality of detected moving objects, the detailed information including the geographical location of the plurality of detected moving objects, and a plurality of identification number indications indicative of the detection order of the plurality of detected moving objects, the plurality of identification number indications being storable in a database.

11. The computing system of claim 10, wherein the source of geographical indicia comprises a map retrieval service.

12. The computing system of claim 10, wherein the source of geographical indicia comprises an elevation look-up table.

13. The computing system of claim 10, wherein an image memory configured to store the received image, wherein the memory is nonvolatile.

14. A method of mapping a detected object in a field of view of a camera, the method comprising:

receiving an image that corresponds to the field of view of the camera;

retrieving a map, wherein the map comprises a region including a physical location of the camera;

identifying a landmark present on the map and present within the field of view;

retrieving geographic location information for the landmark, the geographical location including a longitude and latitude pairing;

identifying a first plurality of pixels in the image as a moving object; and correlating a second plurality of pixels of the image with geographical locations of the landmark and based on the X Y coordinates of the second plurality of pixels, correlating the first plurality of pixels with a specific geographic location;

generating a user interface display that includes:

a map display element that visually corresponds to a portion of the map;

a moving object location indication that is overlaid on the map at a moving object position indicative of the location of the moving object at a position on the map, a plurality of bearing indicators on the map indicative of bearings relative to the field of view of the camera, a landmark location indication that is overlaid on the map at a landmark position indicative of the geographic location information for the landmark, and a track history indication that is overlaid on the map at a history position indicative of a previous geographical location of the moving object at a position on the map the track history indication being configured to automatically fade off of the map over a configurable span of time, a glob that encompasses a group of the plurality of indications of the plurality of detected moving objects on the representation of the field of view of the camera, the glob being indicative of the plurality of detected moving objects being part of a larger moving object, an information window, actuatable by a user, that is overlaid on the map indicative of detailed information of the plurality of detected moving objects, the detailed information including the geographical location of the plurality of detected moving objects, and a plurality of identification number indications indicative of the detection order of the plurality of detected moving objects, the plurality of identification number indications being storable in a database; and displaying the user interface display on a display device.

15. The method of claim 14, wherein the specific geographic location is selected from the group consisting of:

a latitude and longitude pairing;

a bearing and range pairing; and an altitude.

16. The method of claim 14, further comprising:

identifying a third plurality of pixels in the image as a second moving object; and determining the moving object and the second moving object are part of a larger single object.

* * * * *